United States Patent
Lisitsin et al.

(10) Patent No.: US 10,167,409 B2
(45) Date of Patent: Jan. 1, 2019

(54) METHOD AND APPRATUS FOR MANUFACTURE OF 3D OBJECTS

(71) Applicant: Massivit 3D Printing Technologies LTD, Lod (IL)

(72) Inventors: Nataly Lisitsin, Holon (IL); Yoav Miller, Rehovot (IL); Igor Yakubov, Herzlia (IL); Moshe Uzan, Bet Shemesh (IL); Victoria Gordon, Jerusalem (IL)

(73) Assignee: MASSIVIT 3D PRINTING TECHNOLOGIES LTD, Lod (IL)

( * ) Notice: Subject to any disclaimer, the term of this patent is extended or adjusted under 35 U.S.C. 154(b) by 402 days.

(21) Appl. No.: 14/943,395

(22) Filed: Nov. 17, 2015

(65) Prior Publication Data

US 2016/0152860 A1    Jun. 2, 2016

Related U.S. Application Data

(62) Division of application No. 14/712,116, filed on May 14, 2015, now Pat. No. 9,216,543.

(60) Provisional application No. 62/009,241, filed on Jun. 8, 2014.

(51) Int. Cl.

| | | |
|---|---|---|
| C09D 133/14 | (2006.01) | |
| B33Y 70/00 | (2015.01) | |
| C08K 3/36 | (2006.01) | |
| B29C 47/00 | (2006.01) | |
| B29C 47/92 | (2006.01) | |
| B33Y 10/00 | (2015.01) | |
| B33Y 30/00 | (2015.01) | |
| B29C 64/106 | (2017.01) | |
| B29C 64/135 | (2017.01) | |
| B29C 64/129 | (2017.01) | |
| B29L 9/00 | (2006.01) | |

(52) U.S. Cl.
CPC ........ *C09D 133/14* (2013.01); *B29C 47/0045* (2013.01); *B29C 47/92* (2013.01); *B29C 64/106* (2017.08); *B29C 64/129* (2017.08); *B29C 64/135* (2017.08); *B33Y 10/00* (2014.12); *B33Y 30/00* (2014.12); *B33Y 70/00* (2014.12); *C08K 3/36* (2013.01); *B29L 2009/00* (2013.01)

(58) Field of Classification Search
CPC .... C09D 133/14; C08K 3/36; B29C 47/0045; B29C 47/92; B29C 64/135; B29C 64/129
See application file for complete search history.

(56) References Cited

U.S. PATENT DOCUMENTS

| | | | |
|---|---|---|---|
| 4,533,445 A | 8/1985 | Orio | |
| 5,059,266 A | 10/1991 | Yamane | |
| 5,474,719 A * | 12/1995 | Fan | ........................ B29C 41/12 156/273.3 |

(Continued)

FOREIGN PATENT DOCUMENTS

FR    2583333    12/1986

*Primary Examiner* — Sanza L. McClendon
(74) *Attorney, Agent, or Firm* — Jeffrey S. Melcher; Manelli Selter PLLC (57) ABSTRACT

The current three-dimensional object manufacturing technique relies on the deposition of a pseudoplastic material in gel aggregate state. The gel flows through a deposition nozzle because the applied agitation and pressure shears the bonds and induces a breakdown in the material elasticity. The elasticity recovers immediately after leaving the nozzle, and the gel solidifies to maintain its shape and strength.

25 Claims, 5 Drawing Sheets

(56) References Cited

U.S. PATENT DOCUMENTS

| | | |
|---|---|---|
| 7,799,371 B2 | 9/2010 | Fork |
| 8,470,231 B1 | 6/2013 | Dikovsky |
| 2013/0310507 A1 | 11/2013 | Praveen |

\* cited by examiner

METHOD AND APPRATUS FOR MANUFACTURE OF 3D OBJECTS

The present application claims priority to U.S. Provisional Patent Application No. 62/009,241 filed on 8 Jun. 2014, the complete disclosure of which is incorporated herein by reference.

FIELD OF THE TECHNOLOGY

The present invention relates to a method of additive manufacturing and an apparatus useful therefor, particularly with additive manufacturing devices.

BACKGROUND

Three dimensional objects manufacturing process includes deposition of a resin layer, imaging of the layer and curing or hardening of the imaged segments of the layer. The layers are deposited (added) on top of each other and hence the process is called additive manufacturing process by means of which a computer generated 3D model is converted into a physical object. The process involves generation of a plurality of material layers of different or identical shape. The layers are laid down or deposited on top (or bottom) of each of the preceding layer until the amount of layers results in a desired three dimensional physical object.

The material from which the layers of the three-dimensional physical object are generated could come in liquid, paste, powder, gel and other forms. Conversion of such materials into a solid form is typically performed by suitable actinic radiation or heat.

The deposited material layers are thin twenty to forty micron layers. Printing or manufacture of a three-dimensional object is a relatively long process. For example, manufacture of a 100×100×100 mm$^3$ cube would require deposition of 4000 of layers. Such thin layers are mechanically not strong and when a cantilever or a hollow three-dimensional object has to be printed or manufactured there is a need to introduce different structural support elements that would maintain the desired strength of the printed three-dimensional object.

Manufacturing of 3D objects spans over a large range of applications. This includes prototype manufacture, small runs of different products manufacture, decorations, sculptures, architectural models, and other physical objects.

Recently, manufacture of relatively large size physical objects and models has become popular. Large size statues, animal figures and decorations are manufactured and used in different carnivals, playgrounds, and supermarkets. Where the manufacturing technology allows, some of these physical objects are manufactured as a single piece at 1:1 scale and some are coming in parts assembled into the physical object at the installation site.

The time required to build a three-dimensional object depends on various parameters, including the speed of adding a layer to the three-dimensional object and other parameters such as for example, curing time of resin using ultra-violet (UV) radiation, the speed of adding solid or liquid material to the layer which depends on the material itself, layer thickness, the intensity of the curing agent and the desired resolution of the three-dimensional object details.

Manufacture of large objects requires a large amount of manual labor and consumes large amount of relatively expensive materials. In order to save on material costs large objects are printed as shells or hollow structures. The shells could warp, or otherwise deform even in course of their manufacture and multiple support structures integral with the shells or constructed at the installation sites are required to prevent warping or collapse. Since the objects manufactured as shells have their inner space hollow or empty the support structures are mounted or manufactured to be located inside the three-dimensional object.

It is the purpose of this disclosure to provide apparatus, methods and materials that support faster manufacturing of three-dimensional objects in spite of the limitation of different technology elements of the process.

Definitions

Shear thinning or pseudoplasticity as used in the current disclosure, means an effect where a substance, for example a fluid or gel or paste, becomes more fluid upon application of force, in particular a mechanical force such as shear or pressure. The applied force can be agitating, stirring, pumping, shaking or another mechanical force. Many gels are pseudoplastic materials, exhibiting a stable form at rest but become fluid when agitated or pressure is applied to them. Some pseudoplastic fluids return to a gel state almost instantly, when the agitation is discontinued.

The term "gel" when used in the present application refers to a composition comprising a crosslinked system and a fluid or gas dispersed therein, which composition exhibits no or substantially no flow when in the steady-state. The gel becomes fluid when a force is applied, for example when the gel is pumped, stirred, or shaken, and resolidifies when resting, i.e. when no force is applied. This phenomen includes also thixotropy. Although by weight the major part of a gel is liquid, such as up to more than 99%, gels behave like solids due to the three-dimensional network.

The term "cantilever" as used in the present disclosure means a structure resting on a single support vs. a bridge having two supports. Typically, cantilever support is located at one of the ends of the cantilever.

The term "cantilever ratio" as used in the present disclosure means a ratio of the extruded pseudoplastic material cross section to the length of unsupported material.

The terms "strip" and "portion" are both used for a part of pseudoplastic material that has been extruded. Both terms are used exchangeably.

The term "image" refers to a layer of a product produced in one cycle of extrusion, i.e. a layer that is printed in one step by movement of the extrusion unit.

The term "curable monomer" refers to a compound having at least one reactive group that can react with other reactive groups, for example with other monomers, with oligomers or reactive diluents, or can be oligomerized or polymerized, in particular when radiated with suitable radiation. Examples for monomers are acryl based monomers, epoxides and monomers forming polyesters, polyethers and urethanes.

The term "ethylenically unsaturated monomer" refers to monomers that have unsaturated groups that can form radicals when radiated with suitable radiation. The monomers have at least one unsaturated group, such as an $\alpha,\beta$-ethylenically unsaturated group or a conjugated unsaturated system, such as a Michael system.

The term "actinic radiation" refers to electromagnetic radiation that can produce photochemical reactions.

The term "photocuring" refers to a reaction of monomers and/or oligomers to actinic radiation, such as ultraviolet radiation, whereby reactive species are produced that promote cross-linking and curing of monomers or oligomers, particularly cross-linking and curing of unsaturated groups. The term "photocurable" refers to material that can be cross-linked or cured by light.

The term "harden" when used in the present description refers to a reaction that crosslinks or otherwise reacts oligomers and/or reactive diluent, in particular it refers to the reaction between oligomers and reactive diluent resulting in a crosslinked material.

The term "oligomer" refers to polymerized monomers having 3 to 100, such as 5 to 50, or 5 to 20 monomer units.

"Curable oligomers" that are used in the present invention are oligomers having functional groups that can be cured or cross-linked by activation such as by radiation.

The term "reactive diluent" refers to a compound that provides at least one, such as 1, 2, 3, or more functional groups that can react with a curable monomer or oligomer. A reactive diluent can comprise reactive groups like hydroxy groups, ethylenically unsaturated groups, epoxy groups, amino groups, or a combination thereof. For example, a reactive diluent can comprise one or more hydroxy groups and one or more amino groups, ethylenically unsaturated groups etc. Examples of reactive diluents include monofunctional and polyfunctional compounds, such as monomers containing a vinyl, acryl, acrylate, acrylamide, hydroxyl group among others. A reactive diluent typically is a mono-, di- or trifunctional monomer or oligomer having a low molecular weight. Typical examples are acrylate and methacrylate esters including mono-, di-, and tri-(meth) acrylates and -acrylates.

A cross-linking component should provide at least two curable terminal groups. The "cross-linking component" can comprise one or more reactive diluents and further di-, tri-, or multifunctional compounds, if necessary.

A "photoinitator" is a chemical compound that decomposes into free radicals when exposed to light. Suitable photoinitiators are among the group of aromatic α-keto carboxylic acid and their esters, α-aminoalkyl phenone derivatives, phosphine oxide derivatives, benzophenones and their derivatives and other photocuring compounds that are well-known in the art.

The term "rheology modifier" as used in the present invention refers to components that control viscosity and/or can have a thickening action, or are suspending or gelling agents, preventing sedimentation. Rheology modifiers that are useful for the present invention comprise organic and anorganic rheology modifiers and associative as well as non-associative modifiers. Organic rheology modifiers comprise products based on natural materials, like cellulose, cellulose derivatives, alginates, or polysaccharides and their derivatives, like xanthan, or synthetic polymeric materials like polyacrylates, polyurethanes or polyamides. Anorganic rheology modifiers comprise clays, like bentonite clays, attapulgite clays, organoclays, kaolin, and treated or untreated synthetic silicas, like fumed silicas. Inorganic rheology modifiers tend to have high yield values and are characterized as thixotropes.

The term "non-associative rheology modifier" comprises modifiers that act via entanglements of soluble, high molecular weight polymer chains ("hydrodynamic thickening"). The effectiveness of a non-associative thickener is mainly controlled by the molecular weight of the polymer.

The term "associative rheology modifiers" refers to substances that thicken by non-specific interactions of hydrophobic end-groups of a thickener molecule both with themselves and with components of the coating. They form a so called "physical network".

"Viscosity" refers to dynamic viscosity. It is measured using a rheometer, in particular a shear rheometer such as one with a rotational cylinder or with cone and plate, at room temperature, i.e. at 25° C.

The term "extrusion unit" refers to any unit that is capable of extruding a pseudoplastic material. An extrusion unit includes at least one screw and at least one discharge port such as an extrusion head, extrusion nozzle, extrusion die or any other type of extrusion outlet. The terms extrusion nozzle, extrusion die and extrusion head can be used interchangeably.

SUMMARY

The current three-dimensional object manufacturing technique relies on the deposition of a pseudoplastic material in gel aggregate state. A gel is provided that flows through a deposition nozzle because of the applied agitation and the gel's elasticity recovers immediately after leaving the nozzle, and the gel solidifies to maintain or regain its shape and strength. Without being bound by theory it is assumed that shear stress generated by agitation breaks the three-dimensional network bonds within the liquid. After leaving the nozzle the material is no longer under stress and the network recovers immediately after leaving the nozzle, resulting in the gel resolidifying.

Described is a process for producing a three-dimensional object using a pseudoplastic material, an apparatus configured to use the pseudoplastic material and a method of three-dimensional object manufacture using the pseudoplastic material and the current apparatus. The process allows to produce objects that have structures that are difficult to build without supporting structures such as cantilever-like objects.

DESCRIPTION

The present invention is concerned with methods for the manufacture of three-dimensional structures by printing, i.e. by so-called 3D-printing, a material and an apparatus useful therefore, and the use of a pseudoplastic material for 3D printing.

It has been found that using pseudoplastic material, i.e. a composition with decreasing viscosity when shear force is applied, allows to produce sophisticated and complex three-dimensional structures by 3D printing, in particular hollow structures and structures that are cantilever-like, without the need for supporting elements during manufacture.

The pseudoplastic material used according to the present invention shows shear-thinning in a range such that the starting composition having high viscosity when it is transferred to and through an extrusion unit has a viscosity low enough for the transfer and for creating a portion of a 3D structure, such as a strip, or a layer or an image, but has an increased viscosity within short term when it arrives at its predetermined position. Viscosity of the starting composition is also called "first viscosity" and viscosity after application of a force, such as at the outlet of the extrusion unit, is also called "second viscosity". In one embodiment a gel is used which viscosity decreases to about 700-250 mPa·s at a pressure higher than atmospheric pressure. A composition that is useful for this purpose is as defined below.

One three-dimensional object manufacturing technique relies on the deposition of material in gel aggregate state. The gel flows through a deposition nozzle because the applied agitation and pressure shears the inter-particle bonds and induces a breakdown in the elasticity of the material. The material recovers immediately after leaving the nozzle, and the pseudoplastic material or gel almost immediately solidifies to maintain its shape.

A method of forming a three-dimensional object is provided which comprises the following steps:

a) providing a highly viscous pseudoplastic material having a first viscosity and agitating the material to shear the pseudoplastic material and cause it to flow through a delivery system to an extrusion unit;

b) employing an extrusion unit to extrude a strip of the pseudoplastic material in image-wise manner;

c) extruding a second strip of the pseudoplastic material, the second strip adjacent to the first strip and contacting the first strip at at least one contact point;

d) continuously illuminating the first and the second strip to harden the pseudoplastic material; and e) continue to extrude the pseudoplastic material in an image-wise manner and continuously illuminate extruded material to form a three-dimensional object.

Furthermore a method of forming a three-dimensional object is provided comprising:

a) providing a highly viscous pseudoplastic material having a first viscosity and agitating the material to shear the pseudoplastic material thereby decreasing viscosity to a second viscosity and to cause it to flow through a delivery system to an extrusion unit;

b) employing an extrusion unit (116) to extrude a first portion of the pseudoplastic material (204-1) in image-wise manner, the first portion having a cross section with a diameter;

c) illuminating the first extruded portion to harden the pseudoplastic material;

d) extruding a second portion (204-2) of the pseudoplastic material adjacent to the first portion and contacting the first portion at at least one contact point, wherein a cross section of the second portion is shifted (304) in an axis perpendicular to the gravitational force compared to the cross section of the first portion;

e) obtaining a common contact section between the surfaces of the first and second extruded portions by forming an envelope into which a segment of the first portion protrudes by sliding (308), due to the gravitational force, of the second portion along the circumference of the surface of the first portion hardened in step c), wherein the surface of the second portion wets the surface of the first portion at the common contact section;

f) illuminating the extruded second portion to harden the pseudoplastic material and to form a bond between the first and second portions of pseudoplastic material at the common contact section;

g) adjusting the relative position between extrusion unit and extruded second portion such that the second portion obtains the location of the extruded first portion of step b); and h) repeating steps d) to g) until the three-dimensional object has been formed.

The present application also discloses a method of additive manufacture of a three-dimensional object which comprises the following steps:

a) providing a tank with a high viscosity pseudoplastic material and acting to reduce the material viscosity in the tank to shear thin the material;

b) applying to the pseudoplastic material pressure exceeding atmospheric pressure to cause the pseudoplastic material to flow through a delivery system to an extrusion nozzle;

c) extruding in an image-wise manner a first portion of the pseudoplastic material; extruding in an image-wise manner at least a second portion of the pseudoplastic material; and d) wherein the second portion of pseudoplastic material has at least one common contact section with the first portion of the pseudoplastic material; and e) wherein the pseudoplastic material immediately upon extrusion from the nozzle changes the viscosity to a viscosity substantially higher than the viscosity at the pressure exceeding atmospheric pressure.

A three-dimensional object can be obtained with any of the above mentioned methods and the objects obtained are also part of the present invention.

An apparatus that is useful for manufacture of a three-dimensional object comprises a tank for storing a pseudoplastic material at atmospheric pressure; a pump configured to apply agitation to the pseudoplastic material to shear thin the pseudoplastic material and reduce the pseudoplastic material viscosity such as to cause the material to flow; an extrusion unit comprising an extrusion nozzle, an extrusion head, or an extrusion die, configured to extrude in image-wise manner the pseudoplastic material at a pressure exceeding atmospheric pressure; and an X-Y-Z movement system configured to move at least the extrusion nozzle in a three coordinate system.

Figure 1:
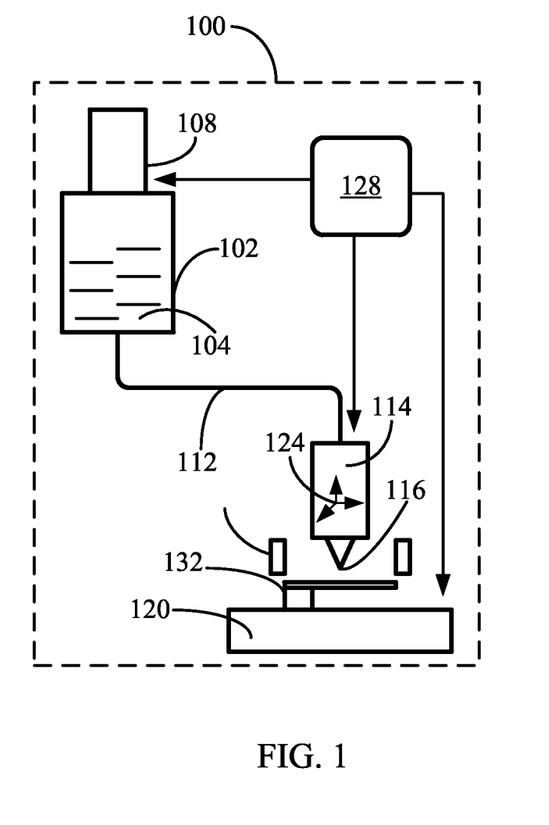
FIG. 1 is a schematic illustration of an example of an apparatus for manufacture of a three-dimensional object.

A system of the present invention is described in detail by reference to FIG. 1 which is a schematic illustration of an example of a system suitable for manufacture of three-dimensional objects or structures. A system of the present invention comprises at least a container such as a tank to receive the pseudoplastic material, a pump to apply a force to the pseudoplastic material, an extrusion unit comprising a nozzle to extrude the pseudoplastic material, and a movement system comprising a control unit, such as a computer.

System 100 includes a container for pseudoplastic material, such as a storage or material supply tank 102 adapted to store a pseudoplastic high viscosity material 104, a pump 108 configured to apply a force to the gel, for example by agitating and shear thinning the pseudoplastic high viscosity material or gel 104, to reduce material 104 viscosity to cause the material to flow. Pumps for such purpose are well-known in the art and any pump that can apply shear to the gel to be extruded is useful. Pump 108 could be such as Graco S20 supply system commercially available from Graco Minneapolis, Minn. U.S.A., or a barrel follower dispensing pump Series 90 commercially available from Scheugenpflug AG, 93333 Neustadt a.d. Donau Germany. Pump 108 in addition to agitation also develops a pressure higher than atmospheric pressure such that the pseudoplastic material 104 flows through a delivery tubing or system 112 to an extrusion (unit) nozzle 116. The higher than atmospheric pressure developed by the pump is communicated to the dispenser and could be such as 0.1 bar to 30.0 bar and typically from 1.0 bar to 20.0 bar and sometimes 2.0 bar to 10.0 bar.

System 100 includes an X-Y-Z movement system 124 configured to move the extrusion nozzle 116 in a three coordinate system. Alternatively, a table 120 could be made to move in a three coordinate system. In another example, the movement in three directions (X-Y-Z) could be divided between the extrusion nozzle 116 and table 120. System 100 also includes a control unit, such as computer 128 configured to control operation of movement system 124, pump 108 pseudoplastic material steering operation and value or magnitude of the pressure higher than atmospheric pressure. The control unit, computer 128 is further adapted to receive the three-dimensional object 132 data and generate from the received data the X-Y-Z movement commands and distance such that the pseudoplastic material 104 is extruded through extrusion unit 114 and nozzle 116 in an image wise manner. The X-Y-Z movement could be performed in a vector mode or raster mode, depending on the object to be printed. Computer 128 could also be configured to optimize the decision on the printing mode.

System 100 further includes a source of radiation for curing the pseudoplastic material. Any illuminator providing radiation that is useful for curing can be used. In FIG. 1 it is a UV LED based source of radiation 136. An example for a source of radiation 136 is a FireJet FJ200 commercially available from Phoseon Technology, Inc., Hillsboro Oreg. 97124 USA. A suitable source of radiation 136 provides UV radiation with total UV power of up to 900 W and with a wavelength that normally is in the range of 230-420 nm, but can also be in the range of 360-485 nm, for example a wavelength in the range of 380-420 nm. Alternatively, a UV lamp such as for example, mercury vapor lamp model Shot 500 commercially available from CureUV, Inc., Delray Beach, Fla. 33445 USA can be used, or any other UV lamp that is available. In one embodiment the source of UV radiation 136 operates in a continuous manner and the UV radiation is selected to harden the pseudoplastic material 104. Computer 128 could also be configured to control operation of source of UV radiation 136 and synchronize it with the printing mode.

Manufacture or formation of a three-dimensional object 132 takes place by extrusion. Initially, a highly viscous pseudoplastic material 104, such as the one that will be described below under test name BGA 0, is provided in tank 102. The pseudoplastic material has a first viscosity or starting viscosity before the material is conveyed to the extruder unit. By application of shear the viscosity is reduced so that the material has a second viscosity which is in a range such that the material easily flows. After extrusion the material rests and regains at least a percentage of the first viscosity.

A suitable first or starting viscosity for the pseudoplastic material 104 could be in the range of about 120,000 to 500,000 mPa·s, such as 100,000 to 40,000 mPa·s at a low shear rate. The viscosity after application of shear can decrease as low as 250 mPa·s. As is shown in FIG. 1, Pump 108 is operative to agitate and deliver material 104 through the delivery system 112 to the extrusion unit 114 and to nozzle 116 and apply to it a varying pressure exceeding the atmospheric pressure. The tested pseudoplastic material formulation has shown different degrees of shear thinning properties and viscosity under different pressure. The pressure applied would typically be in range of 1.0 bar to 5.0 bar. Application of agitation and pressure to material 104 reduces the viscosity of material 104 by a shear thinning process to about 250-700 mPa·s and typically to about 450 to 550 mPa·s. The pressure higher than atmospheric pressure applied to the pseudoplastic material with reduced viscosity is sufficient to shear the pseudoplastic material 104 and cause it to flow through a delivery system 112 to extrusion unit 114 to be extruded through nozzle 116.

In some examples the agitation intensity and application of higher than atmospheric pressure could vary. Extrusion unit 114 or nozzle 116 extrudes a strip or a portion of the pseudoplastic material 104 in image-wise manner. The system can comprise one extrusion unit or more than one unit and one unit can comprise one nozzle or more. There could be one or more extrusion units 114 or nozzles 116 and their diameter could be set to extrude a strip or a portion of the pseudoplastic material 104 with a diameter of 0.5 to 2.0 mm. The diameter of a nozzle can have different forms as is known in the art. Other than round nozzle 116 cross sections are possible and generally a set of exchangeable nozzles with different cross sections could be used with apparatus 100.

Figure 2A:
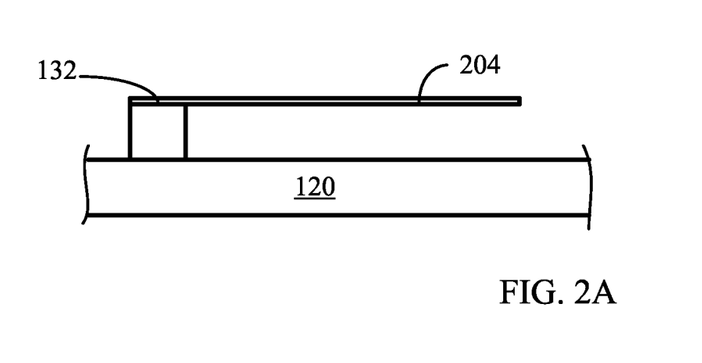
FIGS. 2A and 2B are examples of a three-dimensional object manufactured using the present apparatus.
Figure 2B:
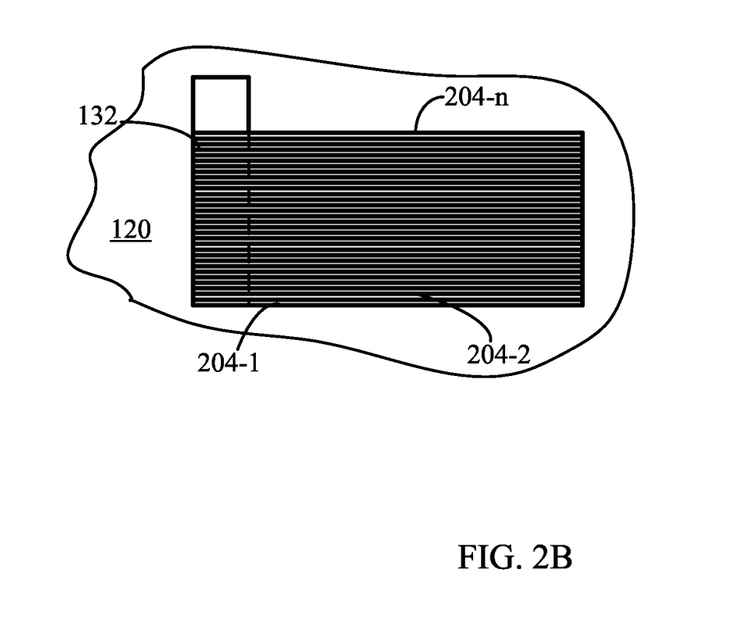

The control unit, such as computer 128, is adapted to receive the three-dimensional object 132 data and generate from the received data the X-Y-Z movement commands and length of strips of pseudoplastic material 204-1, 204-2 (FIG. 2B) and so on, such that the pseudoplastic material 104 extruded through extrusion (unit) nozzle 116 in an image wise manner resembles a slice of object 132. In a similar manner a second strip or a portion of the pseudoplastic material 104 is extruded.

Figure 3A:
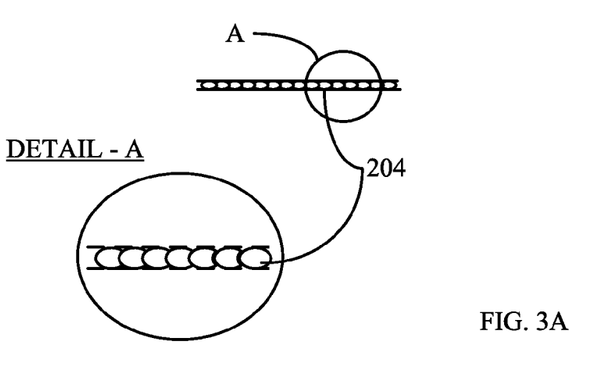
FIG. 3A-3C are illustrations explaining printing or manufacture of a 3D object with the present pseudoplastic material/gel.
Figure 3B:
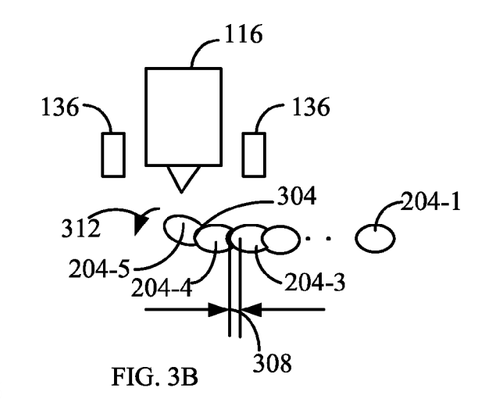
Figure 3C:
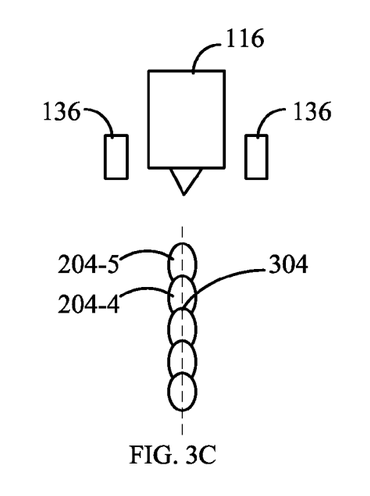

FIGS. 3A-3C are illustrations explaining printing or manufacture of a 3D object with a pseudoplastic material or gel of the present invention. As shown in FIG. 3B, when producing horizontally oriented segments of a three-dimensional object, each next or adjacent strip or portion of pseudoplastic material 204-4 or 204-5 is extruded or printed. Strip or drop 204-5 could slightly shift or slide in a direction indicated by arrow 312 at about the boundary 304 of the previously extruded strip, for example 204-4 or 204-3. The shift or slide 308 could be in a range of ⅕ to ⅓₅, such as ⅒ or ⅓₀ of the extruded strip diameter and the shift or slide value could vary in the process of the three-dimensional object manufacture. Drop or strip 204-5 slides as shown by arrow 312 from its unstable position to a more stable position dictated by the solidification rate of the pseudoplastic material that could be attributed to the material viscosity increase and gravitational forces. The cross-section of the second strip or drop 204-5 is shifted (304) in an axis perpendicular to the gravitational force compared to the cross-section of the first strip or drop 204-4.

Without being bound by theory it is assumed that in the course of a sliding movement of drop or strip 204-5 along the circumference of the adjacent strip, drop or strip 204-5 wets the surface of the adjacent strip 204-4 and the still at least partially liquid drop 204-5 is forming an envelope into which a segment of the previously printed drop or strip 204-4 protrudes. Furthermore, it is assumed that the large contact surface between earlier printed drop/strip and the later extruded drop or strip contributes to extraordinary strength of the bond between the strips/drops. In addition to this, viscosity of the extruded drop/strip is rapidly increasing limiting to some extent the slide of the drop and further contributing to the bond strength. Curing radiation sources 136 are operative in course of printing and by the time drop/strip 204-5 reaches its stable position drop/strip 204-5 solidifies or hardens. In some examples, a shift of a drop/strip can be intentionally introduced.

The bond between the later and earlier extruded strips of pseudoplastic material 104 becomes strong enough to support in a suspended state the later extruded and additional strips of the present pseudoplastic material until the later extruded strip of pseudoplastic material has dropped into a horizontal position alongside the earlier extruded strip of pseudoplastic material.

This bond is sufficiently strong to support printing of hollow and/or cantilever-like structures or three-dimensional objects with a cantilever ratio of at least 1:5 and up to 1:200 and even more without any conventional support structures. Objects of FIGS. 2A and 2B have been printed by strips with diameter of 1.3 mm. Objects of FIGS. 2A and 2B had a cantilever ratio from 1:5 up to more than 1:200. No support structures have been required.

FIG. 3C illustrates manufacture or printing of a vertical segment of a 3D object. In the example of FIG. 3C drops 204 are positioned on top of each other and before the pseudoplastic material solidifies the later printed drop or strip 204-5 wets the surface of the adjacent strip 204-4 and the still, at least partially liquid drop 204-5, is forming an envelope into which a segment of the previously printed drop or strip 204-4 protrudes. Without being bound by theory it is assumed that concurrently to the increase in the viscosity of the extruded drop/strip and the solidification of the pseudoplastic material there is an increase in surface tension of the later extruded drop/strip that further contributes to the bond strength.

Figure 4:
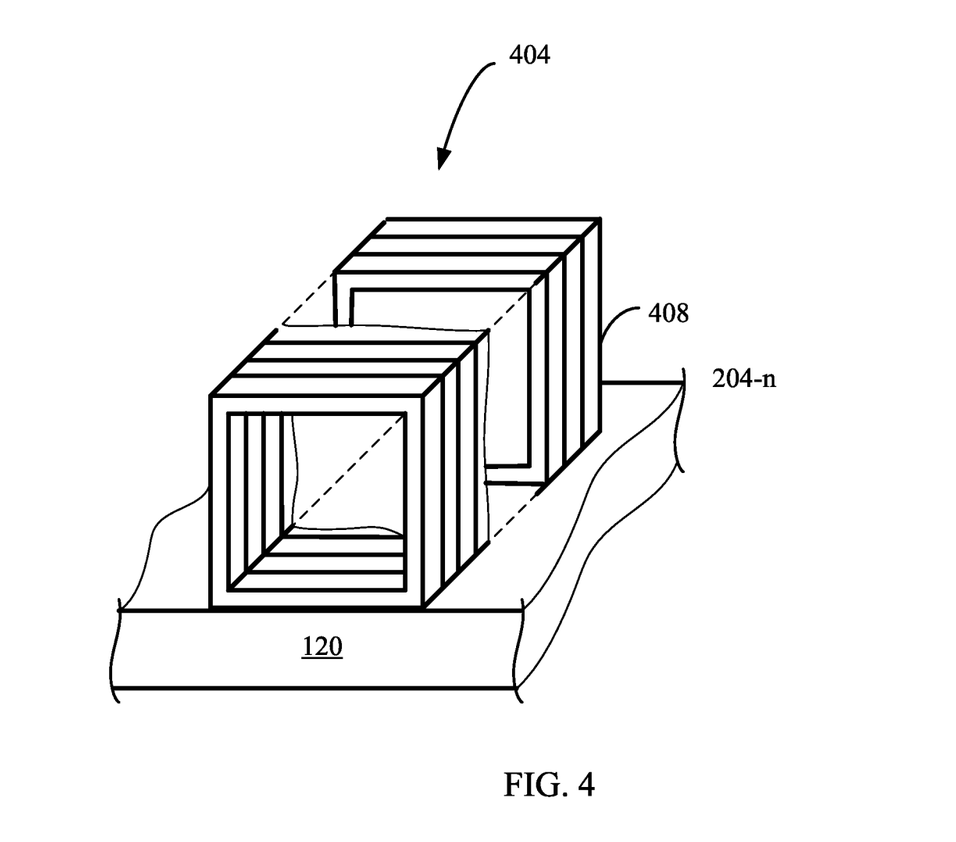
FIG. 4 is an example of a hollow rectangular prism with 90 degrees angles.

The method and system of the present invention are useful for manufacturing hollow articles in a size not available until now without support structures. With the new system it is possible to prepare hollow figures of big size that are stable. FIG. 4 is an example of a hollow rectangular prism with 90 degrees angles. The dimensions of prism 404 cross section are 150×150 mm$^2$. The extruded strips 408 has a square cross section with dimensions of 1.8×1.8 mm2. No internal support structures are required.

The source of radiation that is used according to the present invention can be operated in a continuous mode or a discontinuous mode. The skilled person can choose the mode that is best suited for a specific object and material, respectively. In a continuous mode the source of radiation 136 irradiates the strips of the three-dimensional object 132 being manufactured to harden the extruded material 104. Concurrently, extrusion unit 114 can continue to extrude the pseudoplastic material in an image-wise manner and source of radiation 136 could operate to continuously illuminate or irradiate extruded pseudoplastic material 104 to form a three-dimensional object. In a discontinuous mode the source of radiation is adapted to irradiate the extruded material when it is necessary.

The pseudoplastic material has a first viscosity at atmospheric pressure and a second viscosity at a pressure exceeding atmospheric pressure. The second viscosity is lower than the first viscosity and as the material 104 is leaving the extrusion unit (nozzle) it immediately upon leaving the extrusion nozzle recovers a significant fraction of the first viscosity, such as at least 30%, suitably at least 40%, in particular at least 50% of the first viscosity. The recovered viscosity in a preferred embodiment is between 60 to 90% or even more of the first viscosity.

The formulation of the pseudoplastic or gel material will now be described. The pseudoplastic material or gel used for the present invention comprises at least one curable oligomer, at least one reactive diluent, at least one curing agent, at least one rheology modifier, and optionally at least one performance improving additive and/or further additives.

The curable oligomers used in the present curable composition can be oligomers having at least one ethylenically unsaturated group and can be comprised for example of urethane, epoxy, ester and/or ether units. Oligomers such as acrylated and methacrylated oligomers such as acrylated epoxies, polyesters, polyethers and urethanes are useful. Examples of oligomers useful in the present invention are acryl based or methacryl based oligomers, olefine based oligomers, vinyl based oligomers, styrene oligomers, vinyl alcohol oligomers, vinyl pyrrolidone oligomers, diene based oligomers, such as butadiene or pentadiene oligomers, addition polymerization type oligomers, such as oligoester acrylate based oligomers, for example oligoester (meth)acrylate or oligoester acrylate, polyisocyanate oligomers, polyether urethane acrylate or polyether urethane methacrylate oligomers, epoxy oligomers among others. Those oligomers are known in the art and are commercially available.

Aliphatic polyether urethane acrylate or methacrylate compounds that are useful as oligomers for the present invention can be prepared by reacting an aliphatic diisocyanate with one or more polyether or polyester diols. Useful as oligomers or reactive diluents are polyols having at least two hydroxy groups per molecule such as polyether diols. Another group are polyester diols which can be obtained from dibasic acids and dibasic alcohols, i.e. glycols. Dibasic acids are well-known and commercially available, examples are succinic, glutaric, adipic, pimelic and subaric acid or phthalic acids and derivatives of these acids. Examples for suitable glycols are ethylene glycol, propylene glycol, trimethylene glycol, tetramethylene glycol, isobutylene glycol and mixtures thereof.

The reactive diluents used for the pseudoplastic composition of the present invention are mono- or multifunctional compounds, such as monomers or oligomers carrying one, two, three or more functional groups that can react in a curing reaction. A useful reactive diluent is for example a low molecular compound having at least one functional group reactive with the oligomer in the presence of a curing agent. Typical examples are low molecular weight acrylate esters including mono-, di-, and tri-methacrylates, monoacrylates, diacrylates and triacrylates, or mixtures thereof.

The rheology modifier acts as thickening agent, it can be an organic or inorganic rheology modifier, both of which are well-known in the art. The most common types of modified and unmodified inorganic rheology modifiers that are useful for the present invention, are attapulgite clays, bentonite clays, organoclays, and treated and untreated synthetic silicas, such as fumed silica. Most inorganic thickeners and rheology modifiers are supplied as powders. If they are properly dispersed into a coating, they usually function as suspending or gelling agents and, thus, help to avoid sedimentation. Inorganic rheology modifiers tend to have high yield values and are characterized as thixotropes.

Organic rheology modifiers that are useful for the present invention can be subdivided into products based on natural raw materials, like cellulose or xanthan, and products based on synthetic organic chemistry, like polyacrylates, polyurethanes or polyamides. Other rheology modifiers and thickeners such as polyamides, organoclays etc., can also be used.

The curing agent used for the present invention suitably is at least one photoinitiator. It can be another initiator that is known for this type of reactions, i.e. a compound that generates radicals under predetermined conditions. A useful curing agent can be selected depending for example on the UV source or other reaction condition. It has been found that photoinitiators, such as α-hydroxyketone, α-aminoketone, phenylglyoxylate, benzyldimethyl-ketal, etc., are suitable. In one embodiment for a specific formulation phosphine oxide is used.

Examples for photoinitiators suitable for the present invention are 1-hydroxy-cyclohexyl-phenylketone, available as Irgacure 184 (CAS 94719-3), 2-benzyl-2-dimethyl-amino-1-(4-morpholinophenyl)-butanone-1, available as Irgacure 369 (CAS 119313-12-1) from BASF Ludwigshafen, Germany, bis(2,4,6-trimethylbenzoyl)-phenylphosphinoxide, available as Irgacure 819 (CAS 162881-26-7), diphenyl-(2,4,6-trimethylbenzoyl)phosphinoxide, available as TPO (CAS 75980-60-8), available from BASF Ludwigshafen, Germany.

In one example, the pseudoplastic material or gel 104 comprises of:

Curable oligomer: 30-70%
Reactive diluent: 30-70%
Curing agent: 0.2-7%
Rheology modifier: 1-10%
Performance improving additive/filler 0-30%.

The oligomer typically is one of the family of curable oligomers as described above, for example one having at least one ethylenically unsaturated bond such as acrylated and methacrylated oligomers and in particular acrylated epoxies, polyesters, polyethers and urethanes. The oligomer typically is present be in a proportion of 30-70% by weight.

The reactive diluent can be a substance as described above and typically can be a mono, di and tri functional monomer and the proportion would be about 30-70% by weight. The reactive diluents or monomers would typically be low molecular weight acrylate esters including methacrylates, monoacrylates, diacrylates and triacrylates.

The rheology modifier can be one or more of the substances described above and suitable for use in the current material composition is a filler that provides for a suitable viscosity of the material to be extruded and enhances the shear-thinning properties, such as fumed silica or clay.

The curing agent can be a compound as described above, in particular a photo initiator, and a useful initiator is an alpha cleavage type unimolecular decomposition process photo initiator that absorbs light between 230 and 420 nm, to yield free radical(s). Examples of such alpha cleavage photo initiators could be Irgacure 184 (CAS 947 19-3), Irgacure 369 (CAS 119313-12-1), Irgacure 819 (CAS 162881-26-7) and TPO (CAS 75980-60-8) available from BASF Ludwigshafen Germany.

Examples for further useful additives are performance improving additives and/or fillers. Fillers are well-known in the art and can be used in amounts that are commonly used. Suitable performance improving additives and fillers are for example pigments, glass beads, glass fibers, surfactants, wetting and dispersing additives, impact modifiers, and/or flame retardants.

EXAMPLE

In the following example some commercially available materials have been used:

BR 144 and BR 441-B are polyether and polyester urethane acrylates available from Dymax Corporation, Torrington Conn. 06790 U.S.A. and a number of other suppliers.

CN 981 is urethane acrylate from Sartomer Americas, Exton Pa. 19341 U.S.A.

Ebecryl 3300 is epoxy acrylate from Allnex S.A. Anderlecht, B-1070 Belgium.

03-849 is polyester acrylate from Rahn AGCH-8050 Zurich Switzerland.

TPO is phosphine oxide photo initiator from BASF.

SR 506D, SR 238, SR 833S, SR 351 are mono, di and tri functional reactive diluents available from Sartomer.

Aerosil 200 is fumed silica such as Evonic-Aerosil 200 commercially available from Evonic Corporation Persippany, N.J. 07054 USA.

The table below provides four tested formulations of the pseudoplastic material or gel 104. All percentages refer to weight parts of component or compound per weight of the total composition.

| Ingredient | Formulation #1 | Formulation #2 | Formulation #3 | Formulation #4 |
| --- | --- | --- | --- | --- |
| Polyether and polyester urethane acrylates | 36% | | 16 | 35 |
| Urethane acrylate | | 20 | | |
| Polyether and polyester urethane acrylates | | 16 | | |
| Epoxy acrylate | | | 20 | |
| Polyester acrylate | | | | 12 |
| phosphine oxide photo initiator | 0.5 | 1 | 2 | 3 |
| Mono, di and tri functional reactive diluents | 56% | 55 | | 10 |
| Mono, di and tri functional reactive diluents | | | | 20 |
| Mono, di and tri functional reactive diluents | | | 45 | 12.5 |
| Mono, di and tri functional reactive diluents | | | 10 | |
| Fumed silica | 7.5 | 8 | 7 | 7.5 |
| Urethane acrylate | 36% | 36% | 37.5% | 35 |
| Epoxy acrylate | | 20 | | |
| Polyester acrylate | | | | 12 |
| Photoinitiator | 0.5% | 3% | 2% | |
| Mono. di and tri functional reactive diluent | 56% | 33% | 37.5% | 45.5 |
| Filler (Flame retardant) | | | 15 | |
| Fumed Silica | 7.5% | 8% | 6 | 7 |
| Surfactant | | | 2 | |
| Mechanical strength additive | | | | 0.5 |

The formulation was prepared by dissolving the curing agent, which could be a photoinitiator, in the reactive diluent and then adding the solution to the oligomer. Performance additives, such as surfactants, fillers, and pigments, could be added at the mixing stage and rheology modifiers could be added close to the end of the mixing stage. Different mixing orders have been tested, but no significant changes in the pseudoplastic material properties have been noted.

The mix was prepared by using a planetary mixer and under reduced pressure or vacuum to accomplish simultaneous formulation degassing.

The prepared formulation of the pseudoplastic material had a viscosity of about 200,000.00 mPa·s to 400,000 mPa·s at atmospheric pressure. The viscosity was measured at room temperature (25° C.) by using a rotational rheometer model AR2000, commercially available from TA Instruments New Castle, Del. 19720 U.S.A.

Figure 5:
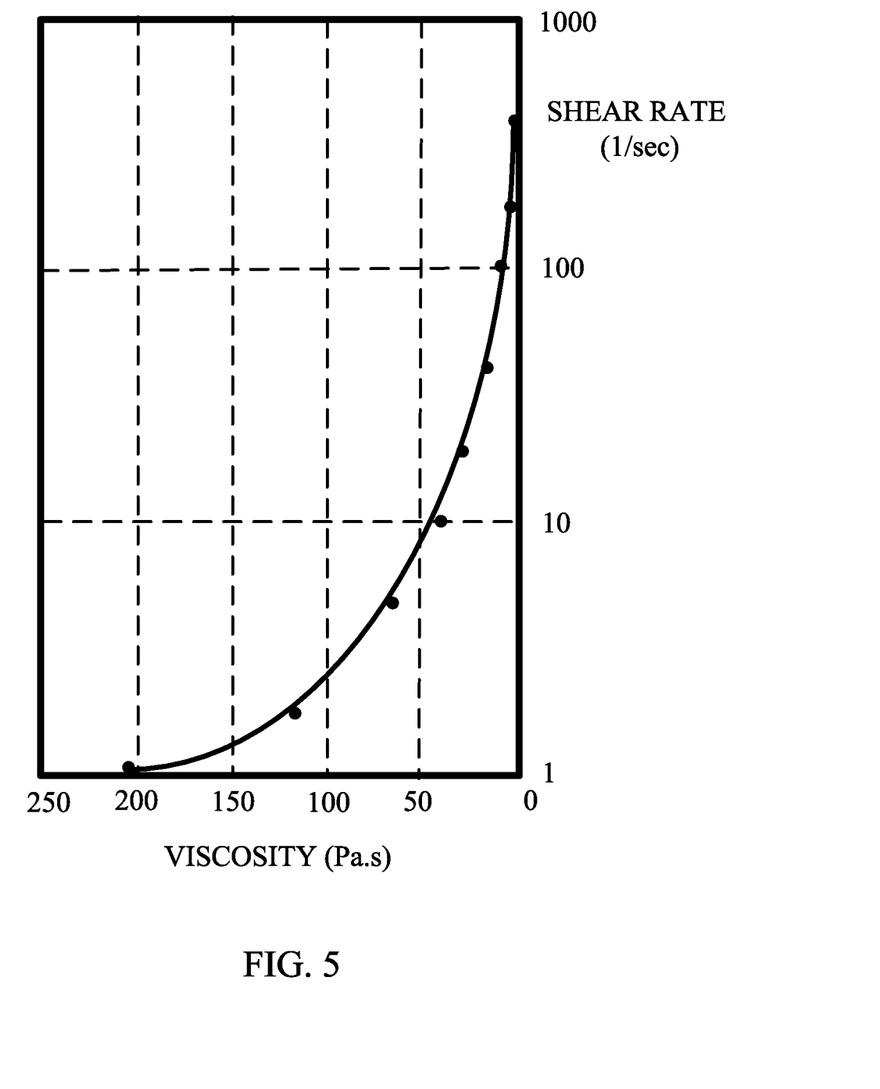
FIG. 5 is a graph that demonstrates the variations of viscosity vs shear rate.

The pseudoplastic material formulation has shown different degrees of shear thinning properties under different degrees of agitation and pressure. FIG. 5 is a graph that demonstrates the variations of viscosity and different shear rates.

It is to be understood that the foregoing illustrative embodiments have been provided merely for the purpose of explanation and are in no way to be construed as limiting of the invention. Words used herein are words of description and illustration, rather than words of limitation. In addition, the advantages and objectives described herein may not be realized by each and every embodiment practicing the present invention. Further, although the invention has been described herein with reference to particular structure, steps and/or embodiments, the invention is not intended to be limited to the particulars disclosed herein. Rather, the invention extends to all functionally equivalent structures, methods and uses, such as are within the scope of the appended claims. Those skilled in the art, having the benefit of the teachings of this specification, may affect numerous modifications thereto and changes may be made without departing from the scope and spirit of the invention.

The invention claimed is:

1. A pseudoplastic material configured for printing of cantilevered three-dimensional objects in an uncured form comprising an uncured composition formulated from:
    30-70 weight-% of at least one curable oligomer;
    30-70 weight-% of at least one reactive diluent;
    0.2-7 weight-% of at least one curing agent;
    1-10 weight-% of at least one rheology modifier; and
    0-30 weight-% of at least one performance additive/filler,
        wherein the pseudoplastic material is formulated to form the cantilevered three-dimensional objects by extruding in image wise manner a first portion of the pseudoplastic material and successively extruding in image wise manner a second portion upon previously extruded portion, such that the second portion due to gravitational force slides over the first portion to form a large contact surface between the first extruded portion and the second extruded portion and wherein a large contact surface contributes to strength of a bond between the first and second portions.

2. The pseudoplastic material according to claim 1, wherein the curable oligomer is at least one curable oligomer of a group of oligomers having at least one ethylenically unsaturated group comprised of urethane, epoxy, ester and/or ether units; and/or wherein the reactive diluent is one of a group of low molecular weight compounds having at least one functional group reactive with the oligomer in the presence of a curing agent, wherein the reactive diluent optionally is selected from acrylate esters consisting of monoacrylates, diacrylates, triacrylates, mono-, di-, or trimethacrylates; and/or wherein the curing agent is a photo initiator of an alpha cleavage type absorbing light between about 230 and 420 nm, wherein the curing agent optionally is 1-hydroxy-cyclohexyl-phenylketone, 2-benzyl-2-dimethylamino-1-(4-morpholinophenyl)butanone-1, bis(2,4,6-trimethylbenzoyl)phenylphosphinoxid, or diphenyl(2,4,6-trimethylbenzoyl)phosphinoxide; and/or wherein the rheology modifier is fumed silica that enhances rheological properties of the pseudoplastic material.

3. The pseudoplastic material according to claim 1, wherein a first viscosity of the pseudoplastic material in the uncured form is in a range of about 120,000.00 mPa·s to about 500,000.00 mPa·s at atmospheric pressure and reduced agitation or shear; and a second viscosity of the psuedoplastic material in the uncured form when an extrusion pressure greater than the atmospheric pressure is applied in combination with agitation or shear is in a range of about 250 to about 700 mPa·s, and wherein after the pseudoplastic material is extruded from a nozzle under the extrusion pressure in image wise manner a rapid transition from the second viscosity to the first viscosity allows the pseudoplastic material in the uncured form to form a segment of the cantilevered 3-dimensional object.

4. The pseudoplastic material according to claim 1, wherein the performance additive is one of a group of additives consisting of pigments, fillers such as glass beads, glass fibers, surfactants, wetting and dispersing additives, impact modifiers, and/or flame retardants.

5. The pseudoplastic material according to claim 3, wherein the psuedoplastic material is configured to can be extruded also in layers to form the cantilevered three-dimensional objects having a cantilever ratio of at least 1:4.

6. The pseudoplastic material according to claim 1, wherein the pseudoplastic material is curable by ultra violet radiation with a wavelength in the range of 360 to 485 nm.

7. The pseudoplastic material according to claim 1, wherein the pseudoplastic material is curable by ultra violet radiation with a wavelength from 380 to 420 nm.

8. The pseudoplastic material according to claim 1, wherein the pseudoplastic material is configured to be extruded onto an earlier extruded portion of cured pseudoplastic material and subsequently cured to form a bond between cured layers of pseudoplastic material.

9. The pseudoplastic material according to claim 8, wherein the bond is strong enough to support a later extruded layer of the pseudoplastic material in a suspended state.

10. The pseudoplastic material according to claim 3, wherein the first viscosity of the psuedoplastic material in the uncured form is sufficient to form the cantilevered three-dimensional object free of any conventional support structures when extruded in layers and cured.

11. A pseudoplastic material configured for printing of cantilevered three-dimensional objects in an uncured form being formulated from a composition comprising:
    30-70 weight-% of at least one curable oligomer;
    30-70 weight-% of at least one reactive diluent;
    0.2-7 weight-% of at least one curing agent;
    1-10 weight-% of at least one rheology modifier; and
    0-30 weight-% of at least one performance additive/filler,
        wherein the pseudoplastic material is formulated to form the cantilevered three-dimensional objects by extruding in image-wise manner a portion of the pseudoplastic material in the uncured form and successively extruding in image-wise manner additional portions of the pseudoplastic material in the uncured form upon the extruded portion, the pseudoplastic material in the uncured form having a first viscosity when under atmospheric pressure and a second viscosity when under an extrusion pressure during extrusion, the extrusion pressure being greater than the atmospheric pressure, the second viscosity being less than the first viscosity, the second viscosity allowing the pseudoplastic material in the uncured form to flow when extruded from a nozzle of a three-dimensional printer, and the first viscosity allowing the uncured pseudoplastic material in the uncured form to immediately solidify under the atmospheric pressure to form and maintain the cantilevered three-dimensional object's shape.

12. The pseudoplastic material according to claim 11, wherein the pseudoplastic material in the uncured form recovers at least 30% of the first viscosity immediately upon being extruded and exposed to the atmospheric pressure.

13. The pseudoplastic material according to claim 11, wherein the pseudoplastic material in the uncured form recovers at least 40% of the first viscosity immediately upon being extruded and exposed to the atmospheric pressure.

14. The pseudoplastic material according to claim 11, wherein the pseudoplastic material in the uncured form recovers at least 50% of the first viscosity immediately upon being extruded and exposed to the atmospheric pressure.

15. The pseudoplastic material according to claim 11, wherein the pseudoplastic material in the uncured form recovers 60% to 90% of the first viscosity immediately upon being extruded and exposed to the atmospheric pressure.

16. The pseudoplastic material according to claim 11, wherein the pseudoplastic material in the uncured form is configured to be extruded in portions to form the three-dimensional objects including cantilever objects having a cantilever ratio of at least 1:4 without the use of structures to support the pseudoplastic material in the uncured form.

17. The pseudoplastic material according to claim 11, wherein the pseudoplastic material can be extruded in strips to form the three-dimensional objects including cantilever objects having a cantilever ratio of at least 1:5 without the use of structures to support the pseudoplastic material in the uncured form.

18. The pseudoplastic material according to claim 11, wherein the pseudoplastic material in the uncured form is configured to be extruded in strips to form the three-dimensional objects including cantilever objects having a cantilever ratio of 1:5 to 1:200 without the use of structures to support the pseudoplastic material in the uncured form.

19. The pseudoplastic material according to claim 11, wherein the second viscosity is in a range of about 250 to about 700 mPa·s.

20. The pseudoplastic material according to claim 11, wherein the second viscosity is in a range of about 250 to about 700 mPa·s at the extrusion pressure of 0.1 to 30 bar.

21. The pseudoplastic material according to claim 11, wherein the first viscosity is in a range of about 120,000 to about 500,000 mPa·s at the extrusion atmospheric pressure.

22. The pseudoplastic material according to claim 1, wherein material viscosity increase and gravitational forces dictate new position of a second portion.

23. A pseudoplastic material for configured for printing of cantilevered three-dimensional objects in an uncured form being formulated from a composition comprising:
30-70 weight-% of at least one curable oligomer;
30-70 weight-% of at least one reactive diluent;
0.2-7 weight-% of at least one curing agent;
1-10 weight-% of at least one rheology modifier; and
0-30 weight-% of at least one performance additive/filler;
wherein the pseudoplastic material in the uncured form is formulated to have a first viscosity when under atmospheric pressure and a second viscosity when under an extrusion pressure during extrusion, the second viscosity being less than the first viscosity, the second viscosity allowing the pseudoplastic material in the uncured form to flow when extruded from a three dimensional printer, and the first viscosity allowing the pseudoplastic material in the uncured form to immediately solidify when exposed to the atmospheric pressure to form and maintain the cantilevered three-dimensional object's shape when the pseudoplastic material in the uncured form is extruded in imagewise manner in strips with each successive strip located upon an earlier extruded strip.

24. The pseudoplastic material according to claim 11, wherein the pseudoplastic material in uncured form has the second viscosity when under an extrusion pressure in combination with an agitation or shear applied when the extrusion pressure is applied by a pump.

25. The pseudoplastic material according to claim 23, wherein the pseudoplastic material in uncured form has the second viscosity when under an extrusion pressure in combination with an agitation or shear applied when the extrusion pressure is applied by a pump.

* * * * *